June 2, 1953 R. H. SHENK 2,640,573
SYNCHRONIZER CLUTCH
Filed Aug. 2, 1949 6 Sheets-Sheet 1

FIG. 1.

INVENTOR
ROBERT H. SHENK
BY
Florian G. Miller
ATTORNEY

INVENTOR
ROBERT H. SHENK
BY
ATTORNEY

Patented June 2, 1953

2,640,573

UNITED STATES PATENT OFFICE 2,640,573

SYNCHRONIZER CLUTCH

Robert H. Shenk, Erie, Pa., assignor to American Flexible Coupling Company, Erie, Pa., a corporation of Pennsylvania Application August 2, 1949, Serial No. 108,104

8 Claims. (Cl. 192—53)

This invention relates generally to disengaging type gear couplings and more particularly to novel means for synchronizing the speed of aligned gears in a gear coupling whereby a connection may be made therebetween through a shifting sleeve to transmit rotative force.

There are many instances in which one gear of a coupling is rotating constantly and it is necessary to bring the other gear to a synchronized speed before a connection therebetween may be made. This is particularly true in large couplings connecting an idle engine shaft to a rotating propeller shaft on a ship in motion. In making a connection with an idle shaft, it is necessary to bring the speed of the gear on the idle shaft to that of the gear on the rotating shaft. Heretofore, no gear coupling has been provided wherein the speeds of the gears connecting the driving and driven shafts were synchronized with the result that many of the gear teeth have been broken and the coupling is rendered inoperable. Because of a certain amount of misalignment between a driving shaft and a driven shaft and the difficulty of engaging the gears on these shafts, shaft couplings have been one of the principal sources of breakdown in a propulsion system. I provide a gear coupling which permits a reasonable degree of misalignment and the engaging and disengaging operation is performed with ease and without damage.

It is, accordingly, an object of my invention to overcome the above and other defects in disengaging type gear couplings and it is more particularly an object of my invention to provide a gear coupling in which the speed of the gears therein are synchronized before engagement which is simple in construction, economical in cost, economical in manufacture, and efficient in operation.

Another object of my invention is to provide a gear coupling wherein the gears are synchronized before engagement and a substantial rotative force is transmitted from the rotating gear to the idle gear before the meshing of the teeth of the idle gear with a splined shifting sleeve.

Another object of my invention is to provide novel means in a gear coupling for moving a splined shifting sleeve to connect a rotating and an idle gear therein, the means comprising a balanced piston shifting member.

Another object of my invention is to provide novel electrical means for automatically controlling the engaging and disengaging operation of my novel gear coupling.

Another object of my invention is to provide novel blocking means for exerting force longitudinally on a pressure ring to initially synchronize the speed of the gears in a gear coupling before engagement thereof.

Another object of my invention is to provide a novel pressure ring and friction clutch members associated therewith for transmitting an initial torque from a rotating gear to an idle gear in a gear coupling.

Another object of my invention is to provide novel means for controlling fluid under pressure for actuating the balanced pistons on a shifting member in my novel gear coupling.

Another object of my invention is to provide a novel combined electric motor and fluid pump and control means therefor for providing a predetermined amount of fluid pressure at predetermined times for the actuation of pistons to operate a shifting member in my novel gear coupling.

A more particular object of my invention is to provide substantially aligned gears in a gear coupling connected to a power shaft and a load shaft wherein one gear may rotate freely relative to the other, synchronizing means are provided to synchronize the rotary motion of one gear with respect to the other automatically through novel mechanical, electrical, and hydraulic means and a splined shifting sleeve is provided for positively engaging the gear teeth of the gears in the coupling.

Another object of my invention is to provide novel lubricating means for a gear coupling.

Other objects of my invention will become evident from the following detailed description, taken in conjunction with the accompanying drawings, in which.

Figure 1:
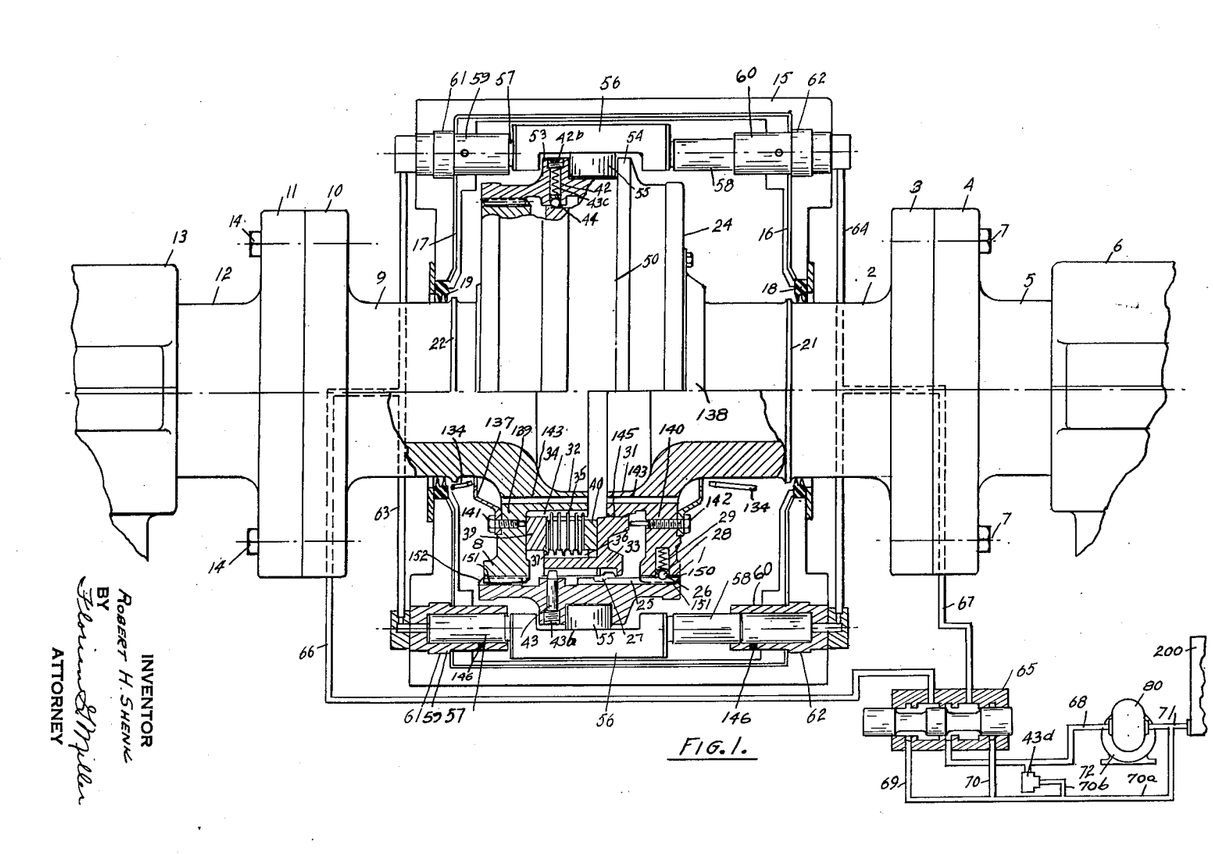
Fig. 1 is a horizontal sectional view with parts thereof broken away of my novel gear coupling in an engaged position.
Figure 2:
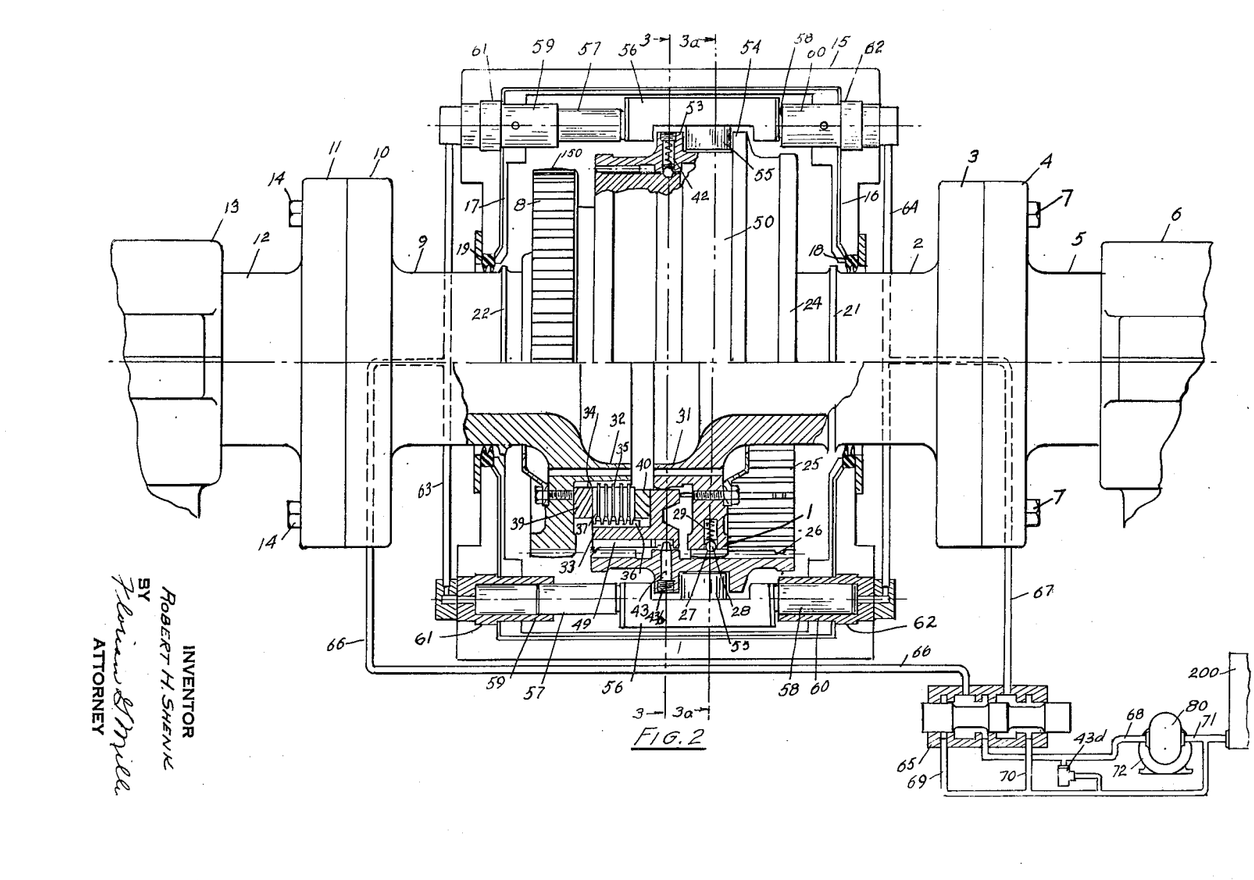
Fig. 2 is a horizontal sectional view with parts thereof broken away of my novel gear coupling in a disengaged position.

Referring now to the drawings, I show in Figs. 1 and 2 an externally toothed gear 1 formed on a shaft 2 having a flange 3 attached by screw bolts 7 to a flange 4 on a propeller or load end shaft 5 journalled in a conventional bearing 6. Gear 8 is the normally driving gear and the aligned, externally toothed opposing gear 1 is the normally driven gear. The driving gear 8 aligned with gear 1 is formed on a shaft 9 having a flange 10 connected by screw bolts 14 to a flange 11 on engine shaft 12 which is journalled in a conventional bearing 13. The power or engine shaft 12 is driven by an engine (not shown). A horizontally split housing 15 houses the aligned gear 1 and gear 8 and it has centrally apertured side walls 16 and 17 supporting suitable annular sealing members 18 and 19 around the periphery of the shafts 2 and 9 to provide a seal therebetween. The shafts 2 and 9 have annular raised portions 21 and 22 adjacent the sealing members 18 and 19 to prevent a lubricant from passing directly in a lateral direction towards the sealing members 18 and 19. A shifting sleeve 24 has internal, longitudinally extending, slightly stepped splines 25 for engaging the external teeth of the gears 1 and 8 respectively. Longitudinally spaced recesses 26 and 27 are circumferentially spaced around the interior of the sleeve 24 for engaging spring urged camming members or balls 28 carried by the gear 1 in radially extending, circumferentially spaced apertures 29 disposed around the periphery thereof. The spring urged balls 28 engage the recesses 27 as shown in Fig. 2 when my novel gear coupling is in a disengaged position and they engage the recesses 26 when my novel gear coupling is in an engaged position as shown in Fig. 1. The gears 1 and 8 respectively have annular, outwardly projecting, concentric portions 31 and 32 forming an annular U-shaped chamber for receiving a pressure ring 33 piloted on the projection 31 of shaft 2. The projecting portion 32 on the gear 8 has external, longitudinally extending splines 34 for engaging internally toothed clutch disks 35. The disks 35 are therefore held against relative rotative movement with respect to the gear 8. The pressure ring 33 also has internal, longitudinally extending splines 36 for engaging the externally toothed clutch disks 37 disposed in overlapping relationship with the clutch disks 35 and adapted to move into frictional engagement therewith upon longitudinal movement of the pressure ring 33. Annular rings 39 and 40 are disposed on opposite sides of the disks 35 and 37, the ring 40 being movable longitudinally with the pressure ring 33. Although disk type clutch plates are shown, other types of friction elements may be incorporated in my gear coupling.

Figure 3:
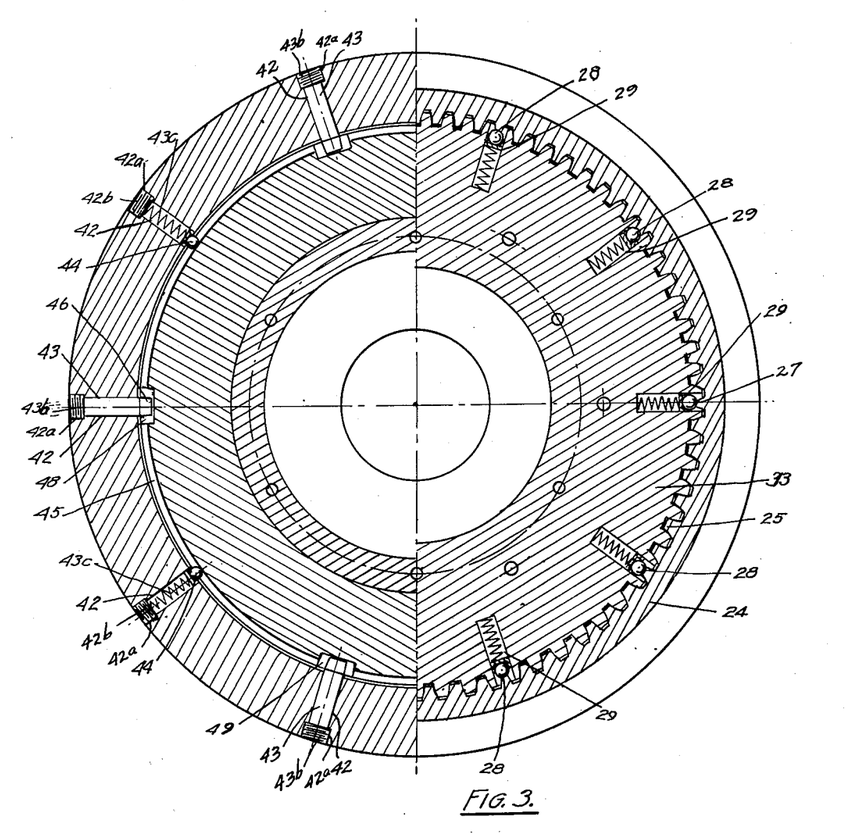
Fig. 3 is a view with the left side thereof taken on the line 3—3 of Fig. 2 and the right side thereof taken on the line 3a—3a of Fig. 2.
Figure 4:
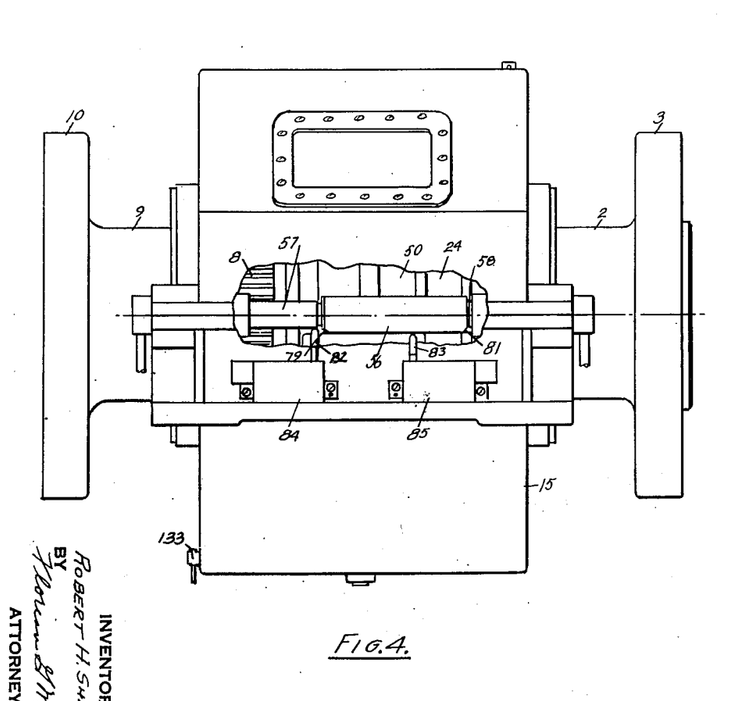
Fig. 4 is a side elevational view with a part thereof broken away of my novel gear coupling.
Figure 5:
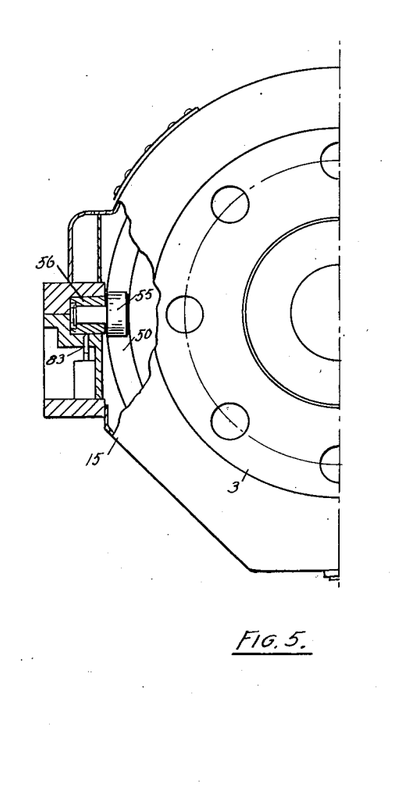
Fig. 5 is an end elevational view of one side of my novel gear coupling with a part thereof broken away for better illustration.
Figures 6, 7:
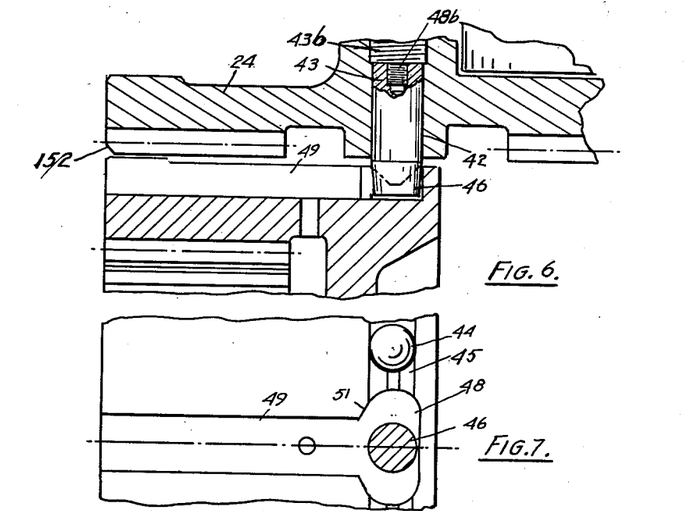
Fig. 6 is an enlarged fragmentary sectional view showing a blocking pin in engagement with a slot on the periphery of the pressure ring.
Fig. 7 is an enlarged fragmentary plan view of a portion of the periphery of the pressure ring with the blocking pin shown in cross section in a disengaged position and showing the position of a camming member in relation to the blocking pin.

The shifting sleeve 24 has circumferentially spaced, radially extending apertures 42 (Fig. 3) for receiving blocking pins 43 and spring urged camming members or ball members 44 spaced alternately around the inner periphery thereof. The apertures 42 have threaded counterbores 42a for threadably engaging the threaded plugs 42b and 43b to restrain and adjust coil springs 43c and the blocking pins 43. The spring urged balls 44 engage a peripheral groove 45 in the pressure ring 33 and the tapered projecting portion 46 of the blocking pins 43 engages and extends into enlarged ends 48 of circumferentially spaced, longitudinally extending grooves 49 when in a disengaged position as shown in Figs. 2, 6, and 7. Oppositely disposed tapered walls or cam portions 51 defining tapered shoulders of predetermined angularity are formed on the inner sides of the enlarged ends 48 of the grooved portions 49 to block the longitudinal movement of the blocking pins 43 after the friction disks 35 and 37 are engaged and upon the continued application of pressure by pressure ring 33. The blocking pins 43 have threaded recesses 48b which may be engaged by a threaded bolt or the like for removal thereof.

Figure 12:
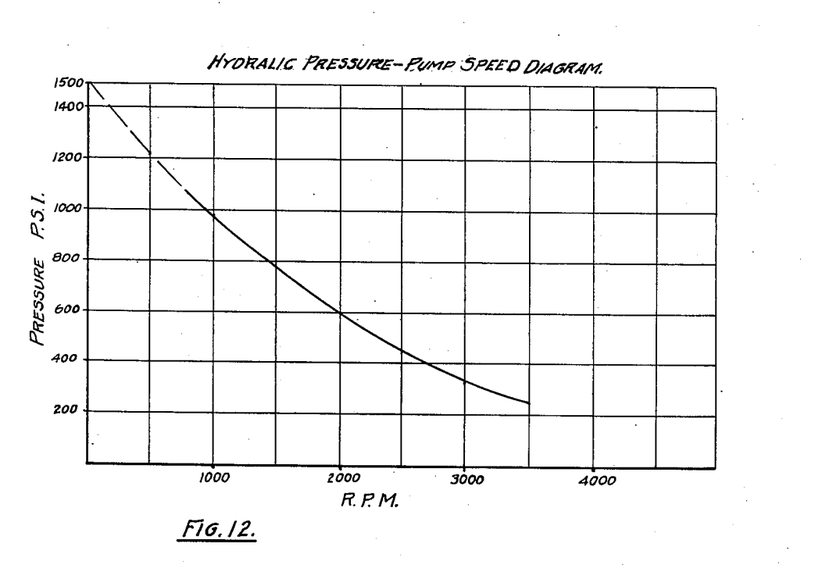
Fig. 12 is a diagram showing the relationship of hydraulic pressure versus pump speed of the hydraulic pump.

The shifting sleeve 24 has spaced, outwardly extending, flanged portions 53 and 54 forming a peripheral groove 50 for receiving rollers 55 carried by oppositely disposed, shifting members 56. The shifting members 56 have oppositely disposed, balanced pistons 57 and 58 for reciprocable movement in open ended cylinders 59 and 60 which are secured in apertures 61 and 62 in the sides 16 and 17 of the housing 15. Cylinders 59 are connected by common pipe lines 63 and cylinders 60 are connected by common pipe lines 64, the pipe lines 63 and 64 being connected to a four-way valve 65 by pipe lines 66 and 67. The valve 65 is connected to the outlet side of an hydraulic pump 80 by a pipe 68 and pipes 69, 70, and 70a are connected with pipe 71 leading from a reservoir 200 to the pump 80. A relief valve 43d is in pipe 70b connecting pipe 68 and pipe 70a. The pump 80 is driven by a high torque electric motor 72, preferably a series wound, commutator type, direct current, electric motor, so as to provide sufficient initial torque to develop the high hydraulic pressure through the pump 80 necessary for initially moving the shifting sleeve 24 and its associated synchronizing elements. A direct current, series wound motor is utilized because it will accelerate the pump displacement after the speed of the gears are synchronized and the force required for synchronizing drops to zero with resulting drop in hydraulic pressure thereby causing rapid completion of the engaging cycle. A diagram showing the relationship between hydraulic pressure and pump speed is shown in Fig. 12. The shifting members 56 have tapered shoulders 79 and 81 on opposite ends thereof for engaging spring urged switch buttons 82 and 83 whereby limit switches 84 and 85 may be alternately energized upon movement of the shifting sleeve 24.

Figure 11:
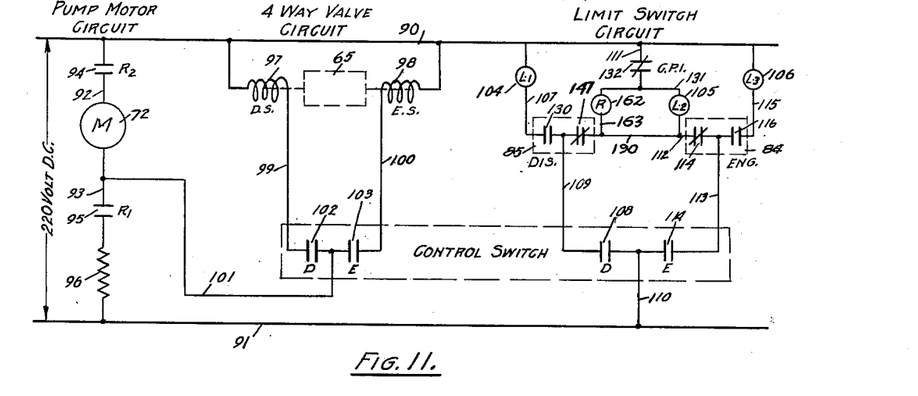
Fig. 11 is a schematic wiring diagram of the electrical circuit used to control the hydraulic circuit in my novel gear coupling.

The schematic electric wiring diagram shown in Fig. 11 for controlling the hydraulic circuit in my novel gear coupling comprises parallel direct current lines 90 and 91 connected to any suitable source. The motor 72 is connected to the wires 90 and 91 by wires 92 and 93, wires 92 and 93 having relay contacts 94 and 95 disposed therein. A cut out protector heater 96 is also disposed in line 93. Also connected across the lines 90 and 91 are two solenoids 97 and 98 for reciprocating the four-way valve 65. The solenoids 97 and 98 are connected by wires 99 and 100 respectively to a common wire 101 which is connected to wire 93. Open contacts 102 and 103 are provided in the lines 99 and 100 to energize one or the other of the solenoids 97 or 98. Contacts 102 are closed for disengagement and contacts 103 are closed for engagement of my novel gear coupling by any suitable conventional switching means. Indicating lights 104, 105, and 106 are also connected across the lines 90 and 91. Indicating light 104 is energized when my novel gear coupling is disengaged, indicating light 105 is energized when the pump 80 is operating, and indicating light 106 is energized when my novel gear coupling is in an engaged position. Light 104 in wire 107 is energized by the limit switch 85 which closes the contacts 130 in wire 107, when the disengaging contacts 108 in connected wire 108 are closed. The wire 109 connects wires 107 and 110 connected with the main lines 90 and 91. Light 105 in line 131 is connected by wire 111 to line 90 and by wires 112, 113, and 110 to line 91 in the engaging circuit and by wires 190, normally closed contacts 147, and wires 109 and 110 to line 91 in the disengaging circuit. A relay 162 is disposed in wire 163 connecting wire 190 and wire 111. Normally closed, cut out protector contacts 132 are provided in wire 111 for protection of the circuit. Light 105 is energized when the contacts 108 or 114 are closed by the control switch and when the normally closed contacts 147 or 114 respectively are in a closed position. Light 106 disposed in wire 115 is energized when the contacts 116 and the contacts 114 are closed, the contacts 116 being closed by the limit switch 84 actuated by a shifting member 56.

The crowns 150 and 151 of the teeth on the gears 1 and 8 are slightly rounded to permit some misalignment of the shafts 2 and 9 while maintaining full contact with tooth engagement, the roots of the internal splines on the sleeve 24 thus serving to pilot the sleeve 24 radially. The ends 152 of the splines 25 on the shifting sleeve 24 are chamfered to facilitate engagement with the teeth of the gear 8 which also have the ends thereof chamfered.

I will now explain the operation of my novel gear coupling. The gears 1 and 8 may be the driving or the driven gears; that is, they may be interchanged without changing the operation of my coupling. For the purpose of explaining the operation of the embodiment of my invention shown in the drawings, I will consider gear 8 as the idle gear and gear 1 as the rotating gear. When the gear 1 is in a disengaged position as shown in Fig. 2, the camming members 28 are in engagement with the recesses 27 in the shifting sleeve 24 and the external teeth of the gear 1 are in engagement with the splines 25 on the shifting sleeve 24. Thus, the shifting sleeve 24 rotates with the gear 1 which may be caused by the rotation of the shaft 5 due to an idle propeller thereon moving through water or by any other means. The pressure ring 33 also rotates with the shifting sleeve 24. Upon closing the contacts 103 and 114, the piston in the four-way valve 65 will be moved by solenoid 98 to the left thereby connecting the pipe 68 connected with the pump 80 in fluid flow relation with pipe 67 and pipe 64 thereby passing fluid under pressure to the cylinders 60 and forcing the shifting members 56 in a longitudinal direction toward the gear 8. The motor 72 is also energized upon the closing of the contacts 103 to actuate the pump 80 to provide a predetermined amount of hydraulic fluid at a predetermined maximum pressure as determined by the setting of the pressure relief valve 43d, to the pistons 60. Light 105 will also be energized upon the closing of contacts 114.

Upon initial movement of the shift members 56, the spring loaded balls 44 and the blocking pins 43 in the sleeve 24 start to move towards the gear 8. The spring loaded balls 44 positioned in the detent groove 45 maintain the pressure ring 33 out of engagement with the friction disks 35 and 37 when my novel gear coupling is disengaged and the balls 44 initiate the functioning of the friction disks 35 and 37 upon moving to an engaged position. The ball detent groove 45 in the pressure ring 33 is positioned in relation to the balls 44 so that an axial force is exerted by the balls 44 on the pressure ring 33 prior to the engagement of the blocking pins 43 with the sloping walls 51 of the enlarged ends 48 of the cam grooves 49. This initial axial force provided by the balls 44 causes an initial engagement of the friction disks 35 and 37 developing an initial torque reaction in these elements which in turn causes the pressure ring 33 to be rotated until the blocking pins 43 are brought into contact with the sloping walls 51, the blocking pins 43 being moved into contact with one or the other of the lateral sides 51 of the enlarged ends 48 of the grooves 49 according to the direction of rotation of the pressure ring 33. The balls 44 engaging the groove 45 in the pressure ring 33 have now served their function and the engaging portions 46 of the blocking pins 43 engage one or the other of the sloping walls 51 thereby increasing the axial force on the pressure ring 33 due to the build up of hydraulic pressure. This axial force is balanced by the cam surfaces 51 and it is transmitted directly to the friction disks 35 and 37. The shaft 9 is thus brought to a synchronized speed with the rotating shaft 2 and as the acceleration drops to zero, the forces exerted at the cam surfaces 51 by the blocking pins 43 become unbalanced and the engaging portion 46 of the blocking pins 43, along with the sleeve 24, move toward the gear 8, the engaging portion 46 of the blocking pins 43 moving from the cam walls 51 in the enlarged ends 48 of the grooves 49 into the parallel sided portion thereof. When this occurs, the axial engaging force applied to the friction disks 35 and 37 is released and the sleeve 24 moves freely towards the gear 8 to an engaged position. The hydraulic power is made available for operating the engaging cycle by means of the series wound direct current motor 80 and the gear pump 72 so that a relatively high hydraulic pressure is available at small displacement to supply the axial force necessary to synchronize automatically a relatively high displacement at the lower pressure necessary to complete the engagement after the gears are synchronized so that the completion of the engagement will be as rapid as possible.

The slope of each of the camming walls 51 of the enlarged ends 48 of the grooves 49 is formed such that any force exerted on one or the other of the sloping walls 51 by the blocking pins 43 in moving towards the gear 8 is balanced by a component of a tangential force perpendicular to this force due to the reaction of the friction disks 35 and 37 in transmitting the torque necessary to accelerate the speed of the shaft 9 to synchronize with the speed of the shaft 2, plus the friction component between the blocking pins 43 and the cam surfaces 51. There will always be a torque reaction of the friction disks 35 and 37 due to the torque required to accelerate either the shaft 2 or shaft 9 if the speeds of these two shafts are not the same because of the inertia of the shafts and connected equipment. The greater the force exerted in attempting to move the blocking pins 43 towards the gear 8, the greater will be the torque developed by the friction disks 35 and 37 and the greater will be the tangential reaction at the cam surfaces 51 which will balance the axial force exerted by the blocking pins 43. This condition will remain until the speeds of the shafts 2 and 9 are synchronized and there is no longer a torque required to accelerate the shaft speeds. When this occurs, the forces at the point of contact of the blocking pins 43 and the cam sides 51 of the enlarged ends 48 of the grooves 49 will no longer balance and the blocking pins 43 can be moved on towards the gear 8, provided the conditions of the drive do not require some other torque to be transmitted through the friction disks 35 and 37 great enough to maintain the balance.

Figure 8:
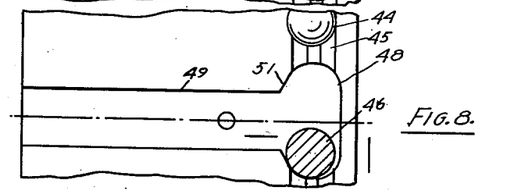
Fig. 8 is a fragmentary plan view of a portion of the periphery of the pressure ring showing the position of a blocking pin at the commencement of the shift and it also shows the position of a camming member in relation to the position of the blocking pin.
Figures 9, 10:
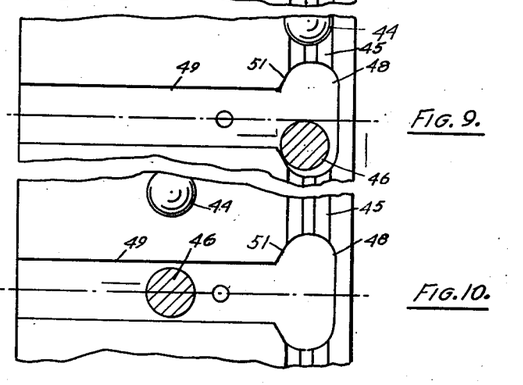
Fig. 9 is a fragmentary plan view of a portion of the peripheral surface of the pressure ring showing a blocking pin in a position when the speed of the driven gear approaches the speed of the rotating gear and the relative position of one of the camming members with respect to the blocking pin.
Fig. 10 is a fragmentary plan view of a portion of the periphery of the pressure ring in my novel gear coupling showing the position of a blocking pin and a camming member associated therewith after the driving and driven gears have become synchronized and the splined shifting sleeve has moved into meshing engagement with the teeth on the driven gear.

In the particular operation of the blocking pins 43, after the initial longitudinal movement of the pressure ring 33 causes the engagement of the friction disks 35 and 37 to initially rotate the gear 8, they move from a position in some part of the enlarged ends 48 of the slots 49 as shown in Fig. 7 to a position shown in Fig. 8 when the pressure ring 33 is moving clockwise due to the torque created by the engagement of the camming members 44 with the side of the groove 45 in the presrure ring 33. The blocking pins 43 will then engage one of the shoulders 51 in the enlarged ends 48 of the slotted portions 49 thereby greatly increasing the torque to further rotate the gear 8. As the speed of the gear 8 becomes equal to that of the gear 1, the acceleration of the gear 8 drops to zero and the blocking pins 43 begin to move toward the axial center line of the slots 49 as shown in Fig. 9 and move longitudinally of the slots 49 as shown in Fig. 10 and the splines 25 on the shifting sleeve 24 fully engage the external teeth on the gear 8. The camming members 44 are moved out of the groove 45 in the pressure ring 33 when the blocking pins 43 move longitudinally of the slots 49 as shown in Fig. 10.

When the sleeve 24 moves to an engaged position, the limit switch 84 closes contacts 116 to energize the light 106.

The sleeve 24 is moved to a disengaged position by closing the contacts 102 and 108. The motor 72 is energized, solenoid 97 moves the piston in the solenoid valve 65 to the right to connect pump 80, pipe 68, solenoid valve 65, pipe 66, and pipe 63 to cylinders 59 to force the pistons 57 on shifting members 56 to the right. The shifting members 56 move the sleeve 24 out of engagement with the gear 8. The light 105 is energized while the pump 80 is operating and until the limit switch 85 closes the contacts 130 to energize the disengaged light 104.

My novel shifting sleeve 24 is not provided with inwardly projecting flanges in the ends as is common practice in order that a reservoir of oil may be provided submerging the gear teeth when in operation. A continuous supply of oil must therefore be supplied to the two gear meshes from inside by novel gear coupling and allowed to escape through the clearing at the meshes in order to insure proper oil film at the teeth. This supply must approximate in quantity that which escapes through the gear meshes. Lubricating oil is supplied from a single connection 133 on one side of the casing 15 near the bottom thereof which supplies oil to two nozzles 134, one at each end of the case. The oil may be metered by any suitable means such as a removable jet (not shown) at the case connection. The nozzles 134 spray the oil into oil rings 137 and 138 attached to each hub web 139 and 140 by screw bolts 141 and 142. When the hubs 139 and 140 are rotated, the oil is forced through passages 143 in the hubs to the inside area of my novel gear coupling and it passes through suitable apertures (not shown) to lubricate the friction clutch disks 35 and 37 when disengaged, the pressure ring pilot bearing 145 and cam grooves 49 before escaping through the gear meshes. The oil outlet in the casing 15 is designed to provide a sufficient reservoir of oil in the bottom of the casing to lubricate the sleeve flanges 53 and 54 and other rotating parts by partial submersion of the flanges 53 and 54.

The bolts 142 securing the oil ring 138 act as spacer bolts to space the pressure ring 33 a predetermined distance from the web of the gear 1. By backing off the spacer bolts 142, the adjacent projecting ends 31 and 32 of the shafts 2 and 9 respectively may be brought together so as to shorten my novel gear coupling for easy assembly of the unit in a fixed shaft line.

The hydraulic system is provided with a continuous bleed arrangement in the form of loose fitting bleed screws 146 in each actuating cylinder 59 and 60. Thus, if a small positive pressure is maintained to the hydraulic power unit pump supply, the system will be continually purged of air.

The driving or power end and the driven or load end of my novel gear coupling may be interchanged. My novel gear coupling is designed to operate in either direction of rotation and synchronize the shaft speed without respect to which shaft initially has the lower speed.

It will be evident from the foregoing description that I have provided novel means in a gear coupling for synchronizing the two gears therein wherein the forces applied to the synchronizing mechanism are in balance thereby minimizing the impact upon the meshing of the gears upon engagement and disengagement thereof, novel hydraulic means for moving a shifting sleeve, a novel hydraulic system for operating the hydraulic means to move the shifting sleeve, a novel lubricating system, a novel arrangement of a series wound, direct current electric motor with a fluid pump to provide a predetermined displacement of fluid for the hydraulic actuating mechanism upon sudden changes in load thereof, and novel blocking means with associated cam walls for moving a shifting sleeve axially of my novel gear coupling to engage the gears therewith.

Various changes may be made in the specific embodiment of my invention without departing from the spirit thereof or from the scope of the appended claims.

What I claim is:

1. In a disengageable gear coupling, in combination, a hubbed externally toothed driving gear, a hubbed externally toothed driven gear, an internally splined sleeve for engaging the teeth of said gears, an annular pressure ring slidably mounted on the hub of said driving gear concentrically of said sleeve and intermediate said driving gear and said driven gear having circumferentially spaced, longitudinally extending grooves on the periphery thereof and a peripheral groove, said longitudinally extending grooves having enlarged portions adjacent the driving gear side thereof with tapered shoulders, longitudinally movable annular disks rotatable with said pressure ring, annular disks on said hub of said driven gear and rotatable therewith frictionally engageable with the longitudinally movable disks rotatable with said pressure ring to initially transmit rotative force from said driving gear to said driven gear upon initial longitudinal movement of said sleeve, blocking pins spaced around the inner periphery of said sleeve for disposal in the longitudinally extending grooves of said pressure ring, said blocking pins being adapted to engage said tapered shoulders in the enlarged ends of said slots upon initial longitudinal movement of said sleeve toward the driven gear until the speed of the driven gear is synchronized with the speed of the driving gear wherein said pins move longitudinally of said slots, releasing said disks and said pressure ring, spring-urged balls carried by said sleeve engaging one side of the peripheral groove in said pressure ring upon initial longitudinal movement of said sleeve to initially move said pressure ring to engage said friction disks before said blocking lugs engage the tapered shoulders of the enlarged ends of said slots, and means for moving said sleeve longitudinally.

2. In a disengageable gear coupling as set forth in claim 1 wherein an adjustable screw member extends through said driven gear for limiting the longitudinal movement of said pressure ring.

3. In a disengageable gear coupling, in combination, an externally toothed driving gear, an externally toothed driven gear, an internally splined sleeve engageable with the teeth of said gears, an annular pressure ring disposed intermediate said driving gear and said driven gear and enclosed therebetween by said sleeve, said pressure ring having circumferentially spaced, longitudinally extending grooves on the periphery thereof with enlarged portions adjacent the driving gear side thereof defining tapered shoulders and an annular groove connecting said enlarged portions of said grooves, cooperating disks rotatable with said pressure ring and said driving gear, respectively, frictionally engageable with each other for transmitting rotative force therebetween, blocking pins spaced around the inner periphery of said sleeve for disposal in the longitudinally extending grooves of said annular ring adapted to engage said tapered shoulders in the enlarged portions of said grooves upon initial longitudinal movement of said sleeve toward said driven gear until the speed of said driven gear is synchronized with the speed of the driving gear wherein said blocking pins move longitudinally of said grooves, spring urged balls circumferentially aligned with said blocking pins and engageable with the peripheral groove around said pressure ring for initially moving said friction disks into frictional engagement to initially transmit rotative motion to said driven gear, said moving sleeve forcing said balls from said groove and releasing said friction disks from frictional engagement with each other upon longitudinal movement thereof in said slots, and actuating means for moving said sleeve longitudinally.

4. In a disengageable gear coupling as set forth in claim 1 wherein spring-urged camming members are carried by and spaced around the circumference of said driving gear for engagement with longitudinally and circumferentially spaced recesses on the inner side of said sleeve to position said sleeve in an engaged and a disengaged position respectively.

5. In a disengageable gear coupling, in combination, an externally toothed driving gear, an externally toothed driven gear, a splined cylindrical sleeve engaging the teeth of said gears, a pressure ring disposed between said driving gear and said driven gear enclosed by said sleeve between said gears, said pressure ring having circumferentially spaced, longitudinally extending grooves with enlarged ends defining tapered shoulders on the driving gear end thereof, adjustable means for limiting the longitudinal movement of said pressure ring, cooperating friction disks rotatable with said driven gear and said pressure ring, respectively, and frictionally engageable with each other for initially rotating said driven gear, blocking means carried by said sleeve for initially exerting a longitudinal force on the tapered shoulders in the slots in said sleeve until the speed of said driving gear and said driven gear are synchronized, and actuating means engageable with opposite sides of said sleeve for moving said sleeve longitudinally, said friction disks and the engagement of said blocking means with the tapered portions of said slots being released before engagement of said splined sleeve with said gears upon longitudinal movement of said blocking means in said slots.

6. In a disengageable gear coupling as set forth in claim 5 wherein annular, open, cup-shaped members are secured to the outer sides of said driving and driven gears and lubricating nozzles are provided for forcing a lubricant into said cup-shaped members to lubricate the frictional surfaces in said coupling.

7. In a disengageable gear coupling as set forth in claim 6 wherein the means securing said cup-shaped member to said driven gear are provided to adjustably limit the longitudinal movement of said pressure ring.

8. In a disengageable gear coupling as set forth in claim 5 wherein laterally extending, adjustable spacing bolts are disposed in said driving gear engageable with said pressure ring to limit the longitudinal movement thereof.

ROBERT H. SHENK.

References Cited in the file of this patent

UNITED STATES PATENTS

| Number | Name | Date |
| --- | --- | --- |
| 2,397,943 | Bull | Apr. 9, 1946 |
| 2,468,155 | Backus | Apr. 26, 1949 |
| 2,470,103 | Lochman | May 17, 1949 |